(No Model.) 6 Sheets—Sheet 3.
G. M. HINKLEY, D. B. HANSON & W. H. TROUT.
BAND SAW MILL.
No. 491,683. Patented Feb. 14, 1893.
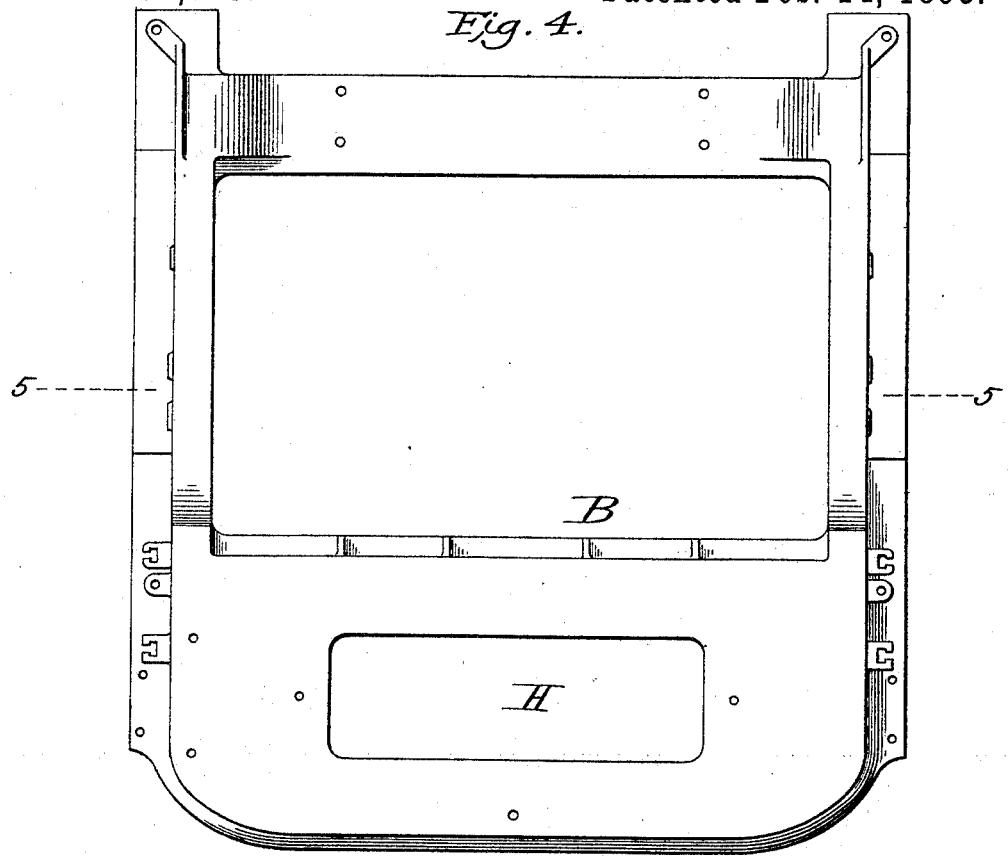
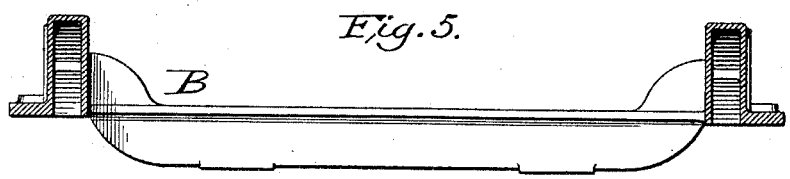
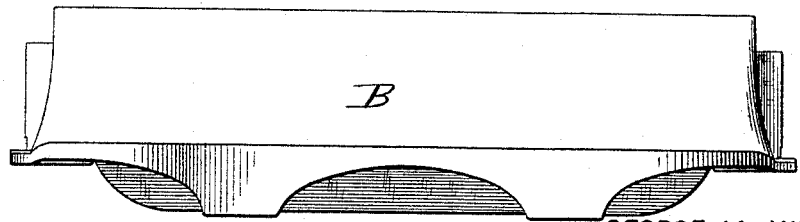

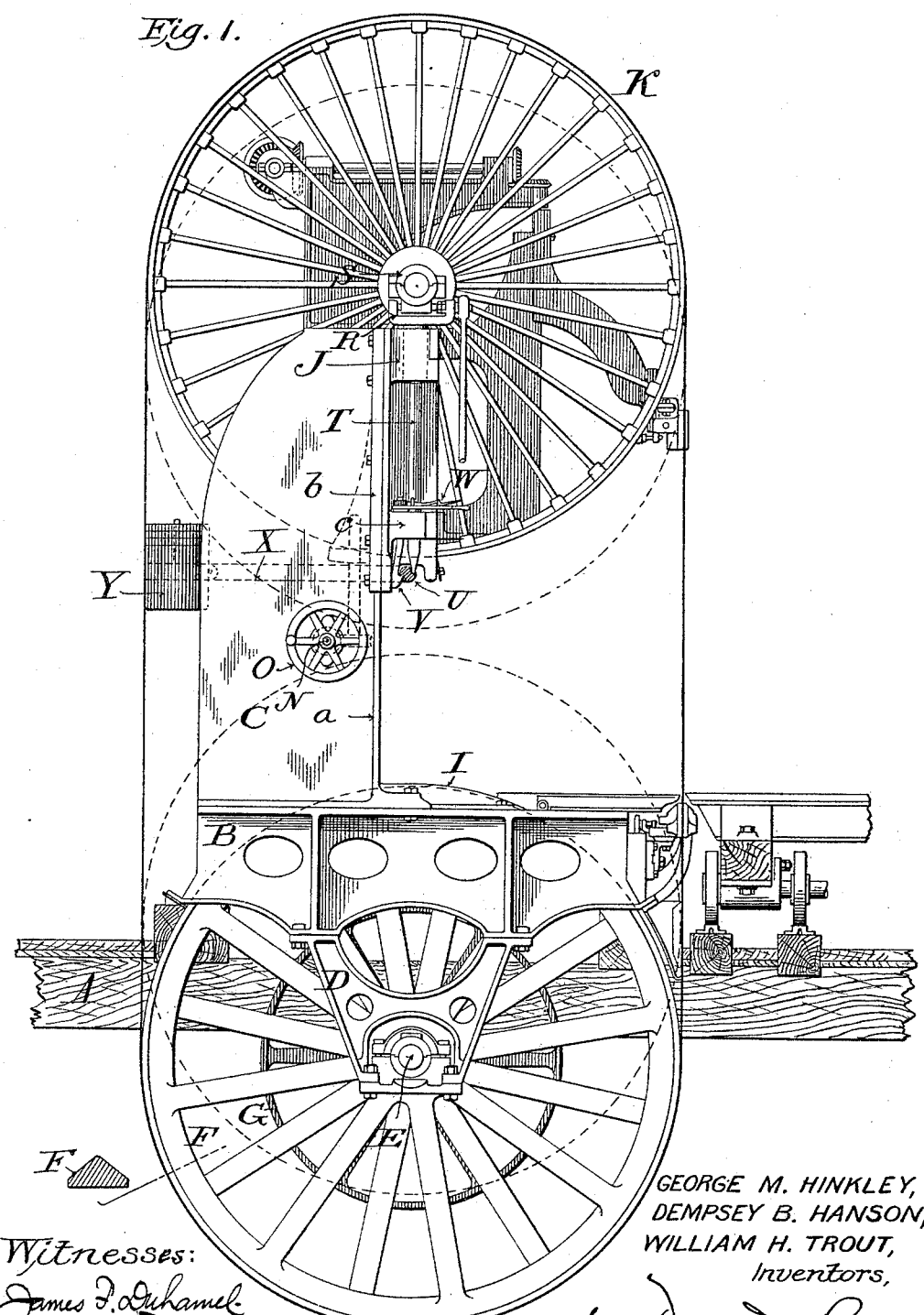

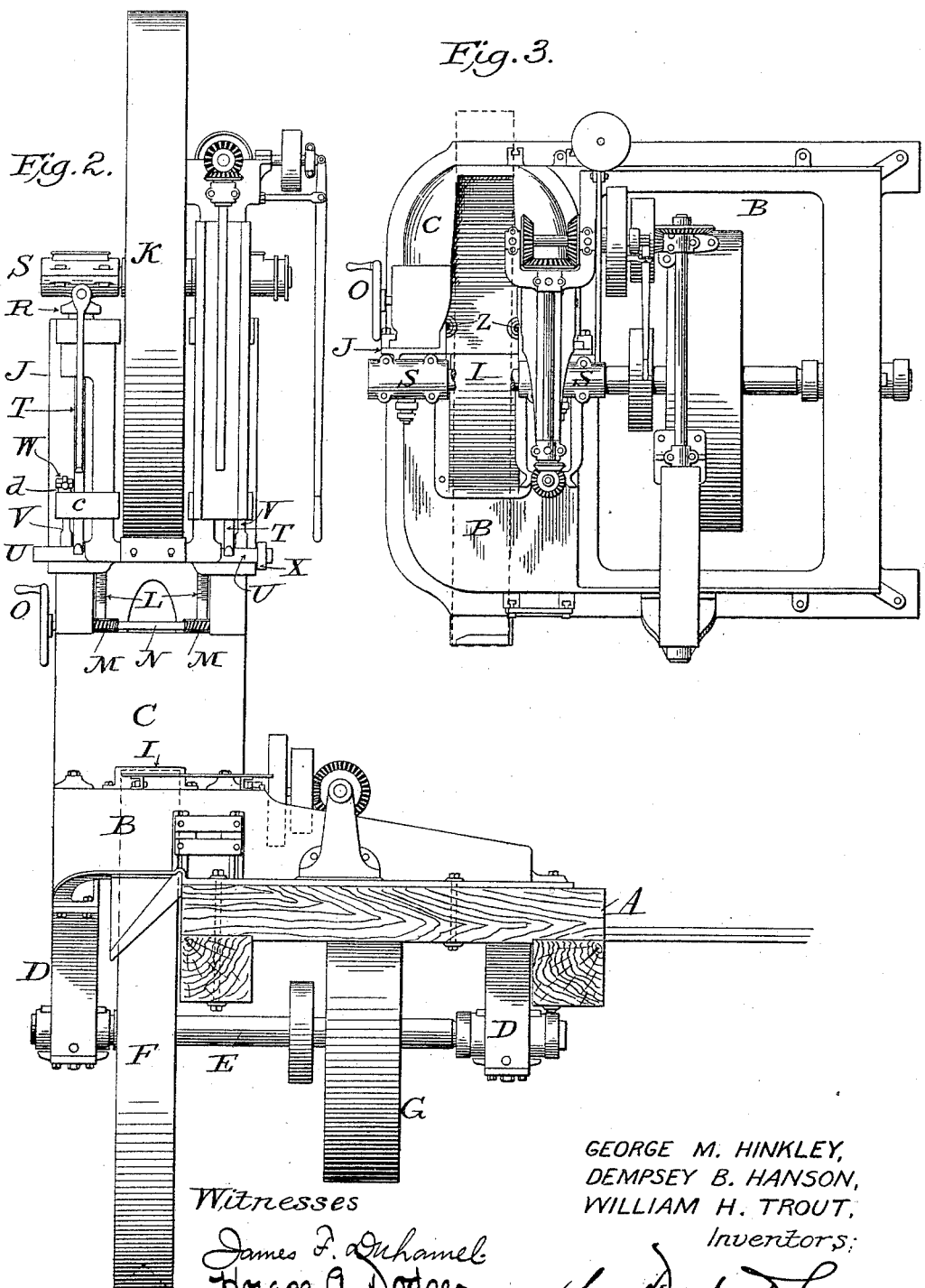

(No Model.) 6 Sheets—Sheet 4.

G. M. HINKLEY, D. B. HANSON & W. H. TROUT.
BAND SAW MILL.

No. 491,683. Patented Feb. 14, 1893.

Witnesses
James F. Duhamel
Horace A. Dodge

GEORGE M. HINKLEY,
DEMPSEY B. HANSON,
WILLIAM H. TROUT,
Inventors
by Dodge Sons Attys.

(No Model.) 6 Sheets—Sheet 5.

G. M. HINKLEY, D. B. HANSON & W. H. TROUT.
BAND SAW MILL.

No. 491,683. Patented Feb. 14, 1893.

Witnesses
James F. Duhamel
Horace A. Dodge.

GEORGE M. HINKLEY,
DEMPSEY B. HANSON,
WILLIAM H. TROUT,
Inventors,
by Dodge & Sons
Attys.

(No Model.) 6 Sheets—Sheet 6.
G. M. HINKLEY, D. B. HANSON & W. H. TROUT.
BAND SAW MILL.
No. 491,683. Patented Feb. 14, 1893.
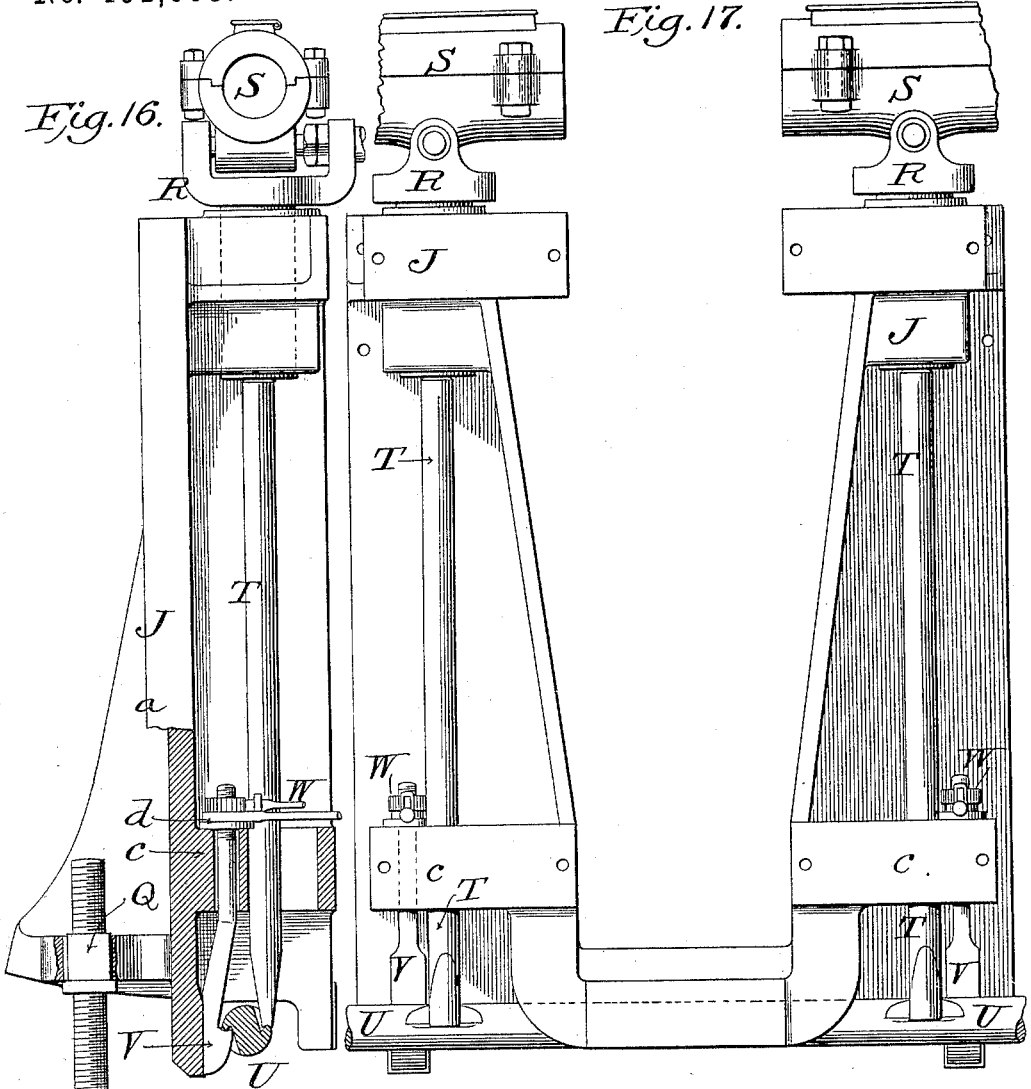
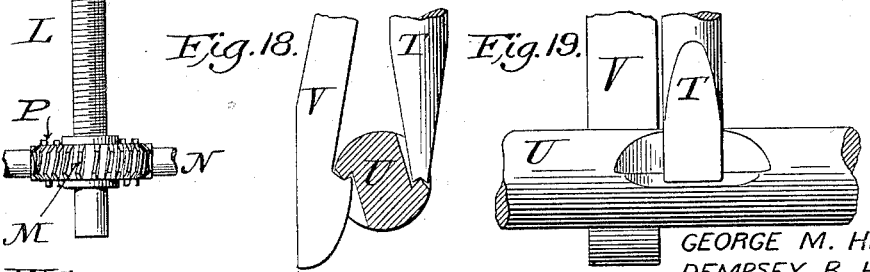
GEORGE M. HINKLEY,
DEMPSEY B. HANSON,
WILLIAM H. TROUT,
*Inventors;*

UNITED STATES PATENT OFFICE.

GEORGE M. HINKLEY, DEMPSEY B. HANSON, AND WILLIAM HENRY TROUT, OF MILWAUKEE, WISCONSIN, ASSIGNORS OF ONE-HALF TO THE EDWARD P. ALLIS COMPANY, OF SAME PLACE.

BAND-SAW MILL.

SPECIFICATION forming part of Letters Patent No. 491,683, dated February 14, 1893.

Application filed June 18, 1892. Serial No. 437,135. (No model.)

*To all whom it may concern:*

Be it known that we, GEORGE M. HINKLEY, DEMPSEY B. HANSON, and WILLIAM HENRY TROUT, citizens of the United States, residing at Milwaukee, in the county of Milwaukee and State of Wisconsin, have invented certain new and useful Improvements in Band-Saw Mills, of which the following is a specification.

Our invention relates to band saw mills, and consists in various features, details and combinations hereinafter set forth and claimed.

Figure 7:
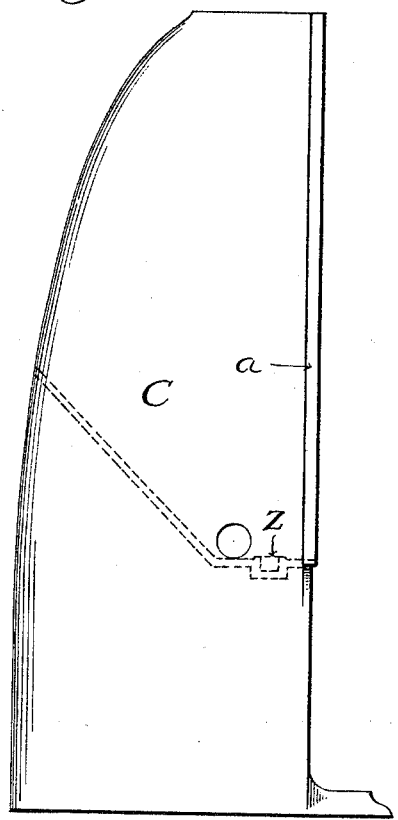
Figure 8:
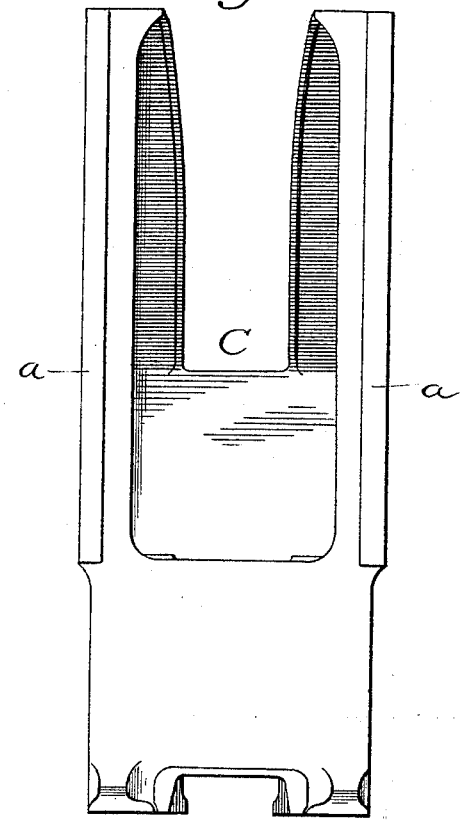
Figure 9:
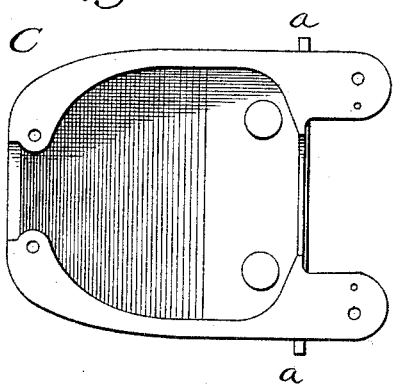
Figure 10:
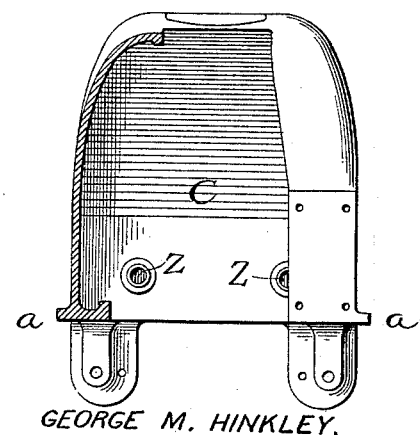
Figure 11:
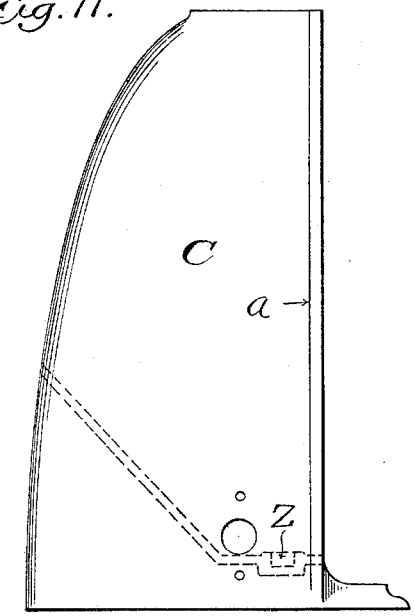
Figure 12:
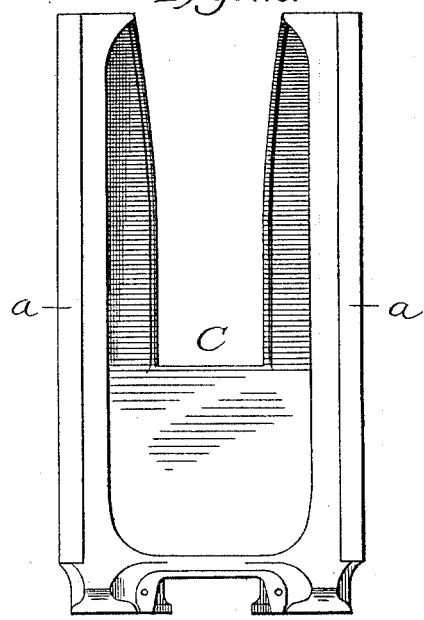
Figure 13:
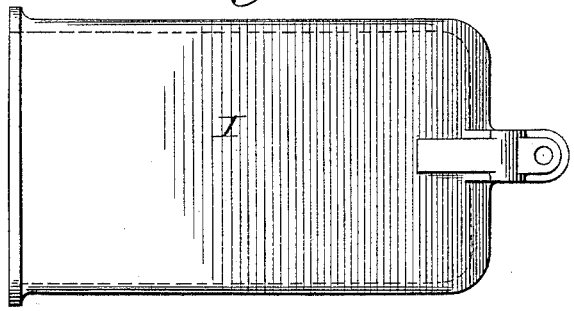
Figure 14:
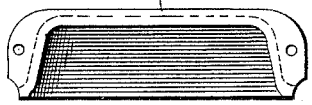
Figure 15:
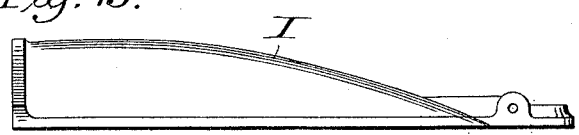

In the accompanying drawings,—Figure 1 is a side view of a band saw mill constructed in accordance with our invention; Fig. 2, a face view of the same; Fig. 3, a top plan view with the upper saw wheel and various other parts removed; Fig. 4, a top plan view of the bed plate of the machine; Fig. 5, a transverse sectional view of the same on the line 5—5 of Fig. 4; Fig. 6, an end view of the same; Fig. 7, a side view of the upright supporting column; Fig. 8, a front face view of the same; Fig. 9, a bottom plan view, and Fig. 10, a top plan view partly in section; Figs. 11 and 12, respectively, side and front elevations of the short upright supporting column; Figs. 13, 14 and 15, respectively, top, front, and side views of the cover plate for the lower supporting wheel; Fig. 16, a side elevation, partly in section, of the yoke or frame in which the upper saw wheel is mounted; Fig. 17, a front face view of the same; and Figs. 18 and 19, views on an enlarged scale, showing parts of the tension mechanism for the saw.

A indicates a framework or support which may be made of timber or of metal, and of most any desired form. Upon this framework is bolted or otherwise rigidly secured the bed plate B, which in turn receives and supports the upright supporting column or standard C and attendant parts. Mounted in suitable brackets D, bolted or otherwise secured to the under side of the plate B, is a shaft E, which shaft carries the lower saw-carrying wheel F and the band wheel G, as clearly shown in Figs. 1 and 2. This plate B is approximately rectangular in shape, and is provided with an opening H as shown in Fig. 4, through which the upper portion of the lower saw-carrying wheel F projects, as indicated by the dotted lines in Figs. 1 and 2.

The upper projecting portion of the wheel F is covered by a plate or cover I, shown in Figs. 1, 2 and 3, and in detail in Figs. 13, 14 and 15,—which cover plate is bolted or otherwise rigidly affixed to the bed plate, or to the front face of the standard or column C, or to both, as may be preferred.

The upright standard or column C has a straight front face provided with guiding ribs or flanges a, which are embraced by corresponding flanges b, formed upon or secured to the yoke or frame J which supports the upper saw-carrying wheel K, as clearly shown in Fig. 1. This column C is made hollow and is bifurcated at its upper end so as to receive the upper saw-carrying wheel, and is further provided with sockets or recesses Z (Fig. 10) to receive the lower ends of the screw shafts L L, which are each provided with a worm wheel M, as clearly shown in Fig. 2.

N indicates a shaft extending horizontally through the upright or column C from side to side, provided outside the column with a hand wheel O, and within the column with worms P, which engage the worm wheels M on the screw shafts L. These screw shafts L enter threaded lugs Q formed on the yoke or frame J, so that when the hand wheel O is turned both of the shafts L L will be turned and the frame J and the upper saw-carrying wheel raised or lowered according to the direction in which the hand wheel O is turned.

The yoke or frame J which is shown in detail in Figs. 16 and 17, is bifurcated and provided at its upper end with perforated forwardly-extending arms to receive the pedestals R of the journal boxes S in which latter the shaft of the upper wheel K is journaled. These pedestals are supported at their lower ends upon rods T, which latter are pointed at their lower ends and bear in a notched bar U extending transversely across the machine as shown in Figs. 1, 2, 16 and 17,—the bar being supported at each end upon a hook V which is carried by the yoke or frame J at its lower end. The stems of the hook V are threaded and project upward through a lug or forwardly-projecting arm $c$ on the frame J, where they are provided with a nut $d$ which is designed to be turned or actuated by means of what is known as a "Lowell" wrench W. By means of this construction and arrangement the hooks may be raised and lowered relatively to the frame in which they are carried, and the rod U raised or lowered correspondingly.

It will be noticed upon reference to Figs. 1 and 16 that the rods T bear upon the cross bar U to one side of the center of the latter, while the hooks V engage a notch on the opposite side of the center of said bar U. Secured upon the end of the bar U is an arm or lever X, which is provided at its rear end with weights Y for the purpose of maintaining a uniform tension upon the saw.

It will be noticed upon reference to Figs. 12 and 16 that there are no projections of any character from the main body of the bar U, the points of support or the notches being located wholly within the circumference of said bar or rod. While in the drawings we have shown this bar or rod as being circular in cross section, this is not essential, for as the rod or bar has no bearings or journals within the ordinary acceptation of that term, it may be made angular in cross section and requires no special fitting or finishing except as to the points of support or notches formed therein.

The weights Y, acting through the lever X, bar U and rods T, serve to support the upper saw-carrying wheel and maintain a uniform tension upon the saw blade at all times.

By mounting the bar or rod U and attendant mechanism upon the yoke or frame J, we are enabled to adjust said frame J and attendant mechanism bodily up and down to suit different lengths of saws without in any manner modifying the action of the tension device. It will also be seen that the tension mechanism may be adjusted and varied without in any manner affecting the position of the bracket J by which said mechanism is carried.

In band saw mills it is very desirable to get the two saw supporting wheels as near together as is possible so as to use the minimum length of saw blade and overcome as far as possible the tendency to buckle and break. This result we secure by the construction herein shown and described, that is to say by making an opening in the bed plate and allowing the lower wheel to project upward therethrough and by bifurcating the upper end of the column so as to permit the upper wheel to project downward therein.

The machine represented in Figs. 1 and 2 was designed primarily for sawing unusually large logs, such for instance as are to be found in California and similar localities; consequently the space between the wheels would seem to be really greater than there is any occasion for. In other work, however, we dispense with the columns shown in Figs. 1, 2, 7, 8, 9 and 10, and use in lieu thereof the short column shown in Figs. 11 and 12, by the use of which and shorter brackets D the wheels F and K may be brought to the position indicated by the dotted lines in Fig. 1. Under this construction and arrangement we are able to bring the wheels closer together than has ever before been done in a machine of this general character, and we secure not only a material saving in material, but also produce a stiffer and steadier running mill.

It is found in practice that any accumulation of dirt, sawdust &c. upon the lower saw-carrying wheel will tend to throw the wheel out of balance, and to obviate this difficulty we make the inner face of the rim of such wheel V-shaped in cross section as shown in Figs. 1 and 2; that is to say, with its side faces arranged at about an angle of forty-five degrees to each other, more or less. The sawdust falling upon these inclined faces will be immediately thrown off, thereby overcoming the objection to which we have just alluded.

Instead of forming the cover plate I separate and independent from the base plate and bolting it to the latter and to the column, it may be made integral with the column or with the plate, as may be preferred. This bed-plate or casting B which carries all the operative parts of the mill, excludes the saw-dust, to a great extent, from the lower saw-carrying wheel F, and is to be distinguished from the framework, or support A which latter will necessarily vary in construction according to particular circumstances.

It will be found upon reference to Figs. 16 and 17 that the outline of the frame or yoke J which supports the upper band saw wheel, varies a little from the form of yoke shown in Figs. 1 and 2; but this is not material, as the two forms of yoke are the equivalent of each other and are alike in all substantial or important features. The same is true of the cover plate I which is shown in Fig. 3 with side flanges by means of which it is bolted to the bed-plate, while in Figs. 13 and 14 it is shown with a rearwardly-extending foot or lug to receive the bolts.

We are aware of the prior patent to Hanson, No. 390,227, and make no claim to anything therein shown and described. In that prior construction the bed-plates are such as have been commonly used, and do not have any opening through which the lower saw wheel may project.

Having thus described our invention, what we claim is:—

1. In a band saw mill, the combination with a framework or support, of a bed-plate B having an opening H up through which the lower band saw wheel may project, a shaft journaled in bearings on said bed-plate and provided with a lower saw-carrying wheel, an upright standard or column mounted upon but independent of the bed-plate, and an upper saw-carrying wheel mounted upon said standard.

2. In combination with a frame work or support, a bed-plate B provided with the opening H, the shaft E journaled in bearings on the bed-plate and provided with a saw-carrying wheel F projecting up into the opening H, a plate I covering the upwardly-projecting portion of the wheel F, an upright column secured to but independent of the base plate, and a saw-carrying wheel supported by the upright column.

3. In a band saw mill, the combination with a frame in which the upper saw wheel is carried, of a bar hung upon hooks on said frame, a weighted lever connected with said bar, and rods supporting at their upper ends the bearings for the upper saw wheel shaft, and resting at ther lower ends upon the rod or shaft, all substantially as shown and described.

4. In a band saw mill, the combination with a frame as J, provided with the perforated lugs c, of the hooks V having threaded shanks extending through the lugs where they are provided with nuts d, a rod or bar U notched to receive the hooks the upper saw wheel K having its shaft journaled in bearings R, S; rods T supporting at their upper ends the said bearings and resting at their lower ends in notches formed in the rod or bar U, and a counterweighted lever projecting from that side of the bar or rod U opposite the rods T.

In witness whereof we hereunto set our hands in the presence of witnesses.

GEORGE M. HINKLEY.
DEMPSEY B. HANSON.
WILLIAM HENRY TROUT.

Witnesses to signatures of G. M. Hinkley and W. H. Trout:
FRANK W. GREENLEAF,
EDWARD KLAUSMAN.

Witnesses to signature of D. B. Hanson:
C. N. BRUNDAGE,
GEO. T. HANSON.